H. FRIEDANDER.
Domestic Boiler.

No. 86,385.             Patented Feb. 2, 1869.

HERMAN FRIEDLÄNDER, OF NEW YORK, N. Y.

Letters Patent No. 86,385, dated February 2, 1869.

IMPROVEMENT IN KETTLES FOR BOILING MILK.

The Schedule referred to in these Letters Patent and making part of the same.

*To all whom it may concern:*

Be it known that I, HERMAN FRIEDLÄNDER, of the city, county, and State of New York, have invented a new and improved Milk-Kettle; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
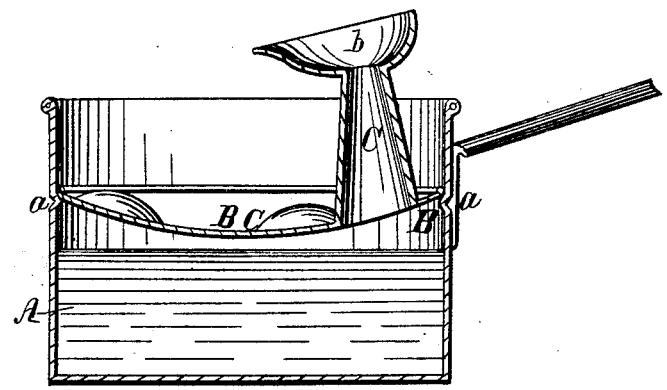
Figure 1 represents a sectional elevation of my improved milk-kettle.
Figure 2:
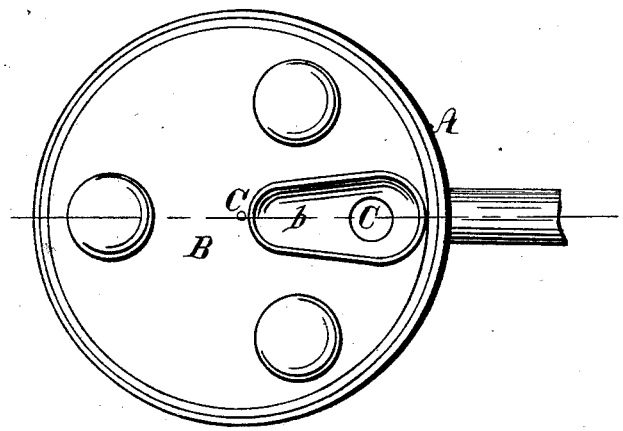
Figure 2 is a plan or top view of the same.

The object of this invention is to prevent milk from boiling over, and from creating the consequent very disagreeable odor.

The invention consists in the application of a weighted cover, from which a tube, having a spout at its upper end, projects upward.

The kettle is covered, and if the milk should boil over, it can only rise in the tube and flow through the spout down upon the cover, whence it flows, through an aperture of the cover, back to the kettle again.

Not only will the aforesaid disagreeable odor be prevented by the use of this invention, but also the loss of milk.

The milk can, when in my improved kettle, be left boiling any desired length of time, and cannot be injured, nor give annoyance by boiling over.

A, in the drawing, represents a sheet-metal or other kettle, of cylindrical or other suitable form, and of suitable size.

B is the cover. The same is made of sheet-metal, or other suitable material, and is heavy enough not to be raised by the steam in the kettle.

It rests either on top of the kettle or on a shoulder, *a*, formed thereon, or is otherwise supported, so as to cover the contents of the kettle.

From the cover B projects upward a pipe, C, which is open at both ends, and which may, at its upper end, have a spout, *b*, as shown.

The milk, when it should boil over, will rise in the tube C, and will flow over the top of the same upon the cover.

The cover should have a somewhat concave surface, and is perforated where it is deepest, as shown at *c* in the drawing. Thereby the milk, which flows over through the tube C, will return to the kettle through the aperture *c*, and cannot flow upon the stove-plate.

I claim as new, and desire to secure by Letters Patent—

The cover B, having the tube C and the aperture *c*, in order to prevent milk from flowing over, as set forth.

HERMAN FRIEDLÄNDER.

Witnesses:
 FRANK BLOCKLEY,
 ALEX. F. ROBERTS.